No. 744,775. PATENTED NOV. 24, 1903.
J. J. MacMULKIN.
FRAME FOR MOTOR CARS.
APPLICATION FILED JULY 10, 1903.
NO MODEL. 2 SHEETS—SHEET 1.
Fig. 1.
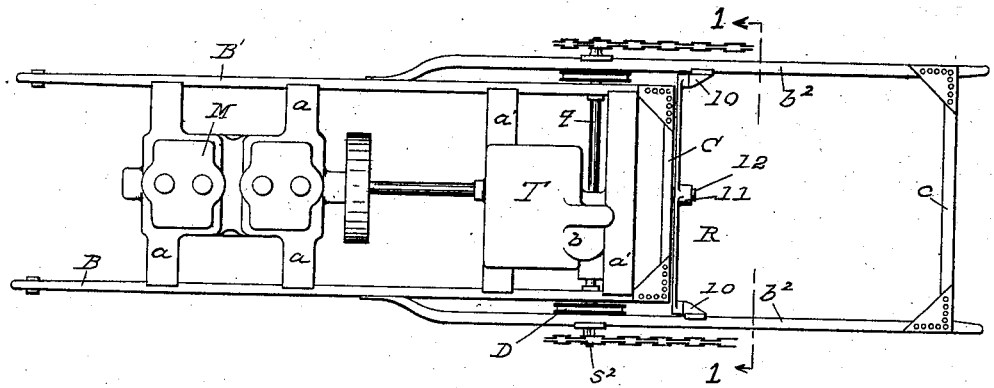
Fig. 2.
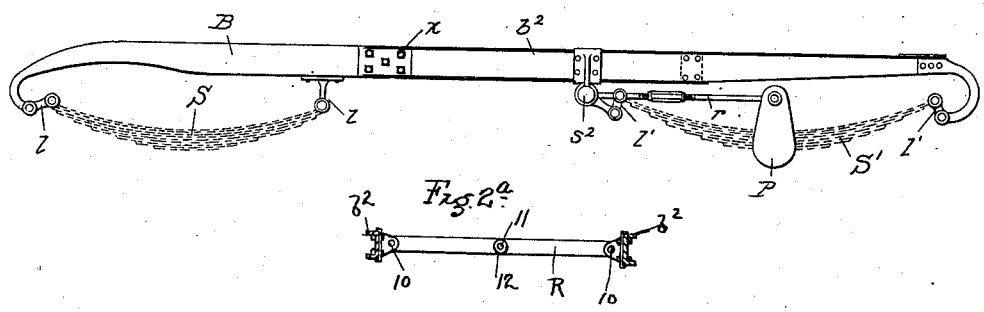
Fig. 2.ª
Fig. 3.
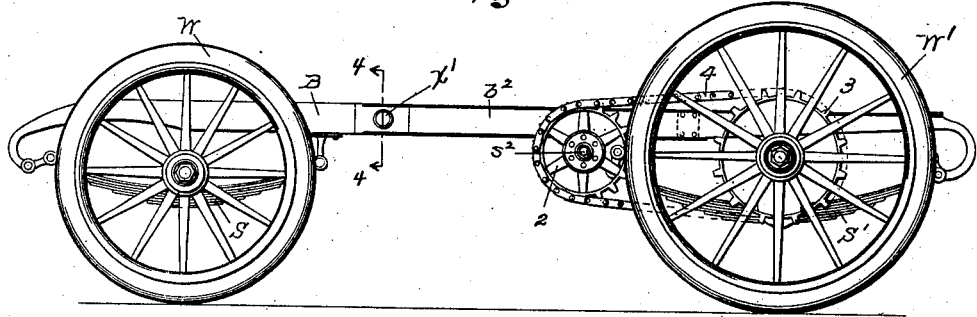
Fig. 4.
WITNESSES:
P. W. Wright
M. T. Miley
INVENTOR
John J. MacMulkin
BY Howson & Howson,
ATTORNEYS

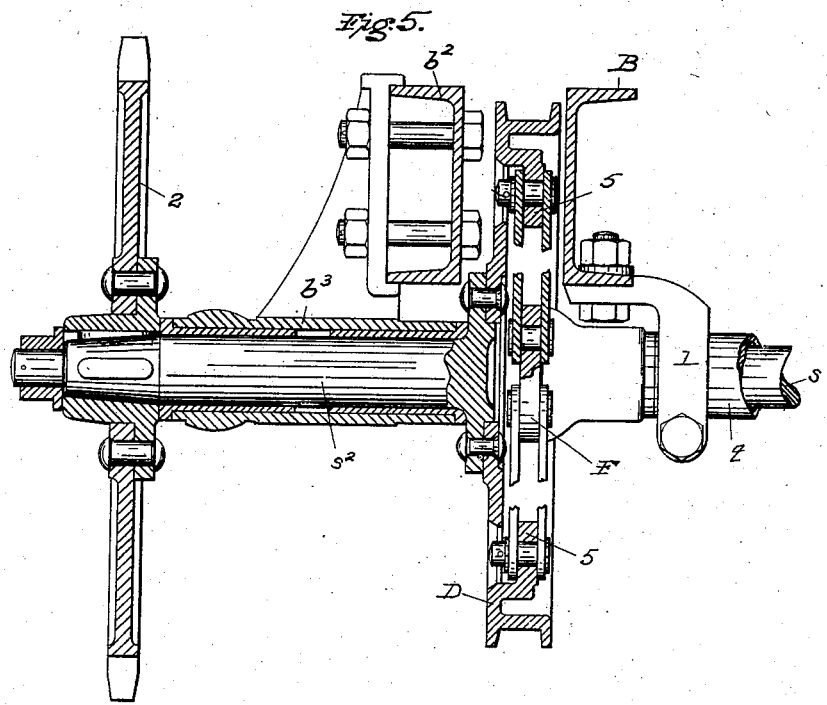
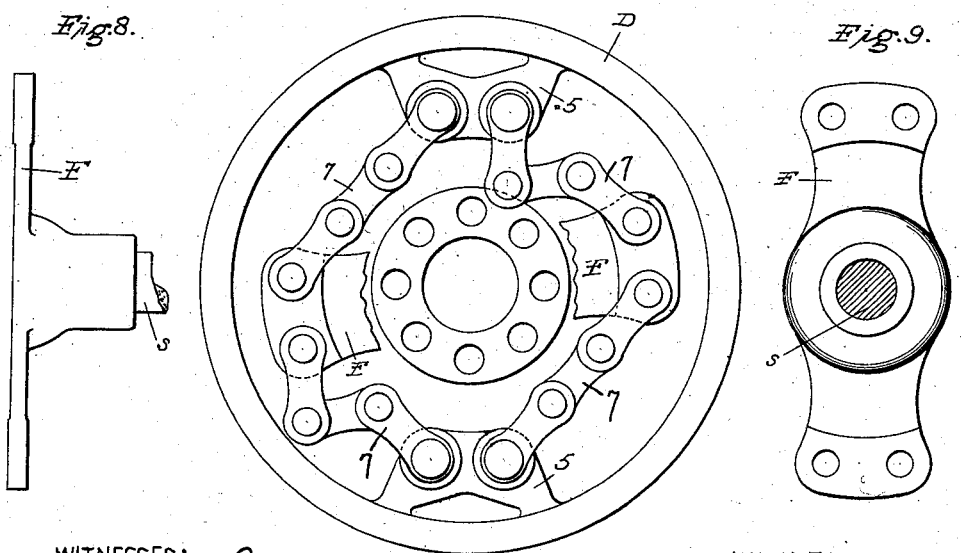

No. 744,775. Patented November 24, 1903.

UNITED STATES PATENT OFFICE.

JOHN J. MacMULKIN, OF LONG ISLAND CITY, NEW YORK, ASSIGNOR TO DAIMLER MANUFACTURING COMPANY, OF LONG ISLAND CITY, NEW YORK, A CORPORATION OF NEW YORK.

FRAME FOR MOTOR-CARS.

SPECIFICATION forming part of Letters Patent No. 744,775, dated November 24, 1903.

Application filed July 10, 1903. Serial No. 164,977. (No model.)

*To all whom it may concern:*

Be it known that I, JOHN J. MACMULKIN, a citizen of the United States of America, residing in Long Island City, in the county of Queens, State of New York, have invented an Improved Frame for Motor-Cars, of which the following is a specification.

This invention has for its object to improve the construction of motor-car frames to prevent the racking and throwing out of alinement the driving and transmission machinery due to the rough usage to which such cars are subjected. To accomplish this purpose, I mount the motor, its shafting, and the transmission-gear, that is rigidly coupled thereto, in a rigid braced frame, and to this frame I secure a pair of the vehicle-wheels, thus giving two forward points of support to the frame. I mount a second frame on the other two wheels, and this second frame is yielding to a limited extent, and between the two frames is a flexible coupling in the transmission-gear, as hereinafter described.

In the accompanying drawings, Figure 1 is a plan of a motor-car frame and the transmission machinery. Fig. 2 is a side elevation of the frame. Fig. 2$^a$ is a section on the line 1 1, Fig. 1. Fig. 3 is a view similar to Fig. 2, but with the wheels in position. Fig. 4 is an enlarged sectional view on the line 4 4, Fig. 3. Fig. 5 is an enlarged sectional view of the flexible coupling. Fig. 6 is a face view of the coupling-plate with parts broken away. Fig. 7 is a view of a part of the chain. Fig. 8 is an edge view of the plate on the driving-shaft, and Fig. 9 is a face view of the same.

The rigid frame is composed of two longitudinal channel-iron side bars B B', connected at one end by a cross-bar C. Suitable links $l$ are secured to this frame, on which the forward spring S is hung. The motors M are mounted between the bars B B', the motor-casing having extending arms $a\ a$, Fig. 1, rigidly secured to the side bars and acting as a brace for the forward end of the frame. The transmission-gear casing T near the other end of the rigid frame has projecting arms $a'\ a'$, also rigidly secured to said frame. In one part of the transmission-casing T there is formed a box $b$, Fig. 1, to hold the differential gear, a tube $t$ extending from each side thereof and being secured by bolts and a hanger 1, Fig. 5, to the side bars B B'. In the interior of this tube $t$ the driving-shaft $s$ rotates, carrying at each side of the frame a plate F, Figs. 5, 6, 8, and 9, flexibly connected by links L, Fig. 6, to a recessed disk D, mounted in the second frame. The second or yielding frame is composed of two side bars $b^2\ b^2$, connected by a cross-bar $c$ and secured at the front ends of the side bars by bolts $x$, as shown in Fig. 2, or by a pivot $x'$, as shown in Figs. 3 and 4, to the rigid frame B forward of the flexible coupling hereinafter described.

Across the yielding frame there is mounted in two pivoted bearings 10 10 a cross-rod R, Fig. 2$^a$. In the center of this rod R, I form a socket 11, in which a pin 12 in the cross-bar $c$ of rigid frame fits. Links $l'\ l'$ are fastened to the yielding frame, and from these links the springs S' are hung.

Each spring S' carries a plate P, in which the wheel W' is mounted. A distance-rod $r$ connects this plate P with the short shaft $s^2$, which is normally in line with the shaft $s$ and is mounted in bearings $b^3$, bolted to the side bar $b^2$. This shaft $s^2$ carries the sprocket 2 on one end and the recessed disk D at its other end, the disk projecting between the two side bars B and $b^2$, Figs. 1 and 5. A sprocket 3 on the driving-shaft is connected by a chain 4 with the sprocket 2, Fig. 3.

The flexible coupling is composed of the recessed disks D, each of which has its rim flanged and grooved, so as to accommodate a brake-strap. Within the disk D an elongated plate F, keyed to the end of the driving-shaft $s$, rotates in the same plane as lugs 5 5 on the disk. The plate F and the lugs 5 are connected with each other through short-linked chains 7 7. It will be obvious that owing to this chain-link connection the plate F and disk D may thus change their relative positions vertically without in any way impeding or disturbing the driving of the wheels W'.

It will be readily seen that should a motor-car constructed as described sink or raise one of its rear driving-wheels a distance for which the springs could not or did not compensate it would only be the yielding frame which would be temporarily thrown out of position. One corner of the yielding frame would rise, (the side bars turning therewith if pivoted or the channel-iron bending if bolted,) lifting one of the pivots 10 on one side and lowering the pivot 10 on the other side. This would raise the center pin 12 with relation to its former position; but the rigidity of the braced frame B B' C would in no way be disturbed. In the event of one of the front wheels being unduly elevated or depressed, the rigid frame will merely twist the yielding side rods $b^2$ $b^2$ of the flexible frame and the alinement of the motor-shaft and transmission-gear would in no wise be affected.

I claim as my invention—

1. A motor-car frame, comprising a rigid frame carrying the motor and transmission mechanism in combination with a yielding frame having longitudinal side rods on which said rigid frame is mounted, substantially as described.

2. A motor-car frame, comprising a rigid frame carrying the motor and transmission mechanism, a yielding frame on which said rigid frame is mounted, driving-wheels mounted on the flexible frame and a flexible coupling between the transmission mechanism and said driving-wheels, substantially as described.

3. A motor-car frame, comprising a rigid frame and a yielding frame having longitudinal side rods between and on which the rigid frame is hung, substantially as described.

4. A motor-car frame, comprising a rigid frame, a yielding frame having longitudinal side rods, between which the rigid frame is hung, a bar across said yielding frame and centrally pivoted to the rigid frame, substantially as described.

5. A motor-car frame, comprising a rigid frame, a yielding frame having longitudinal side rods between which the rigid frame is hung, a bar across said yielding frame pivotally mounted therein, and a pin on the rigid frame fitted into said cross-bar, substantially as described.

6. A frame for motor-cars, comprising a rigid frame, wheels mounted at one end thereof, a yielding frame having longitudinal side bars, the rigid frame being attached to said side bars, driving-wheels on said yielding frame, a cross-bar on said yielding frame pivoted thereto and a pin on the rigid frame centrally engaging the cross-rod, substantially as described.

7. The combination of a yielding frame, a rigid frame free to move relatively thereto, a driving-shaft on one frame and a driven shaft on the other, a disk keyed to one shaft and a plate to the other, with links connecting said shafts, as and for the purpose set forth.

8. The combination of a rigid frame, a pair of supporting-wheels mounted at one end thereof, a yielding frame having a pair of wheels and a cross-bar connected to the yielding frame and centrally pivoted to the rear of the rigid frame, the yielding frame having at its forward end yielding fastenings to said rigid frame, substantially as described.

9. A motor-car frame comprising a rigid frame having two forward points of support, said frame carrying the motor and transmission-gear in combination with a yielding frame also having two points of support, said rigid frame being hung on said yielding frame, substantially as described.

In testimony whereof I have signed my name to this specification in the presence of two subscribing witnesses.

JOHN J. MacMULKIN.

Witnesses:
MALACHI H. RICHARDSON,
GUS. F. BURKARD.